US008383283B2

(12) United States Patent
Yun et al.

(10) Patent No.: US 8,383,283 B2
(45) Date of Patent: Feb. 26, 2013

(54) FUEL CELL WITH ELECTRICAL SHORT CIRCUIT PREVENTION MEANS

(75) Inventors: Chao-yi Yun, New Milford, CT (US); Mohammad Farooque, Danbury, CT (US); Abdelkader Hilmi, Bethel, CT (US); Richard Johnsen, Woodbury, CT (US); Gengfu Xu, Danbury, CT (US)

(73) Assignee: FuelCell Energy, Inc., Danbury, CT (US)

( * ) Notice: Subject to any disclaimer, the term of this patent is extended or adjusted under 35 U.S.C. 154(b) by 304 days.

(21) Appl. No.: 12/424,196

(22) Filed: Apr. 15, 2009

(65) Prior Publication Data
US 2010/0266932 A1 Oct. 21, 2010

(51) Int. Cl.
H01M 2/34 (2006.01)
H01M 8/24 (2006.01)
H01M 2/38 (2006.01)
H01M 2/40 (2006.01)
H01M 8/14 (2006.01)
H01M 2/08 (2006.01)
H01M 2/14 (2006.01)
H01M 4/02 (2006.01)
H01M 4/36 (2006.01)

(52) U.S. Cl. ........ 429/453; 429/460; 429/464; 429/472; 429/478; 429/508; 429/510; 429/529

(58) Field of Classification Search ............. 429/453, 429/460, 463, 508, 510, 464, 472, 478, 529, 429/473
See application file for complete search history.

(56) References Cited

U.S. PATENT DOCUMENTS

| | | | |
|---|---|---|---|
| 6,391,487 B1 * | 5/2002 | Totsuka .................. | 429/480 |
| 6,490,812 B1 | 12/2002 | Bennett et al. | |
| 6,656,625 B1 | 12/2003 | Thompson et al. | |
| 6,979,383 B2 | 12/2005 | Yandrasits et al. | |
| 2002/0081476 A1 * | 6/2002 | Suenaga et al. .............. | 429/33 |
| 2003/0072988 A1 | 4/2003 | Frisch et al. | |
| 2004/0214071 A1 * | 10/2004 | Barnett et al. .............. | 429/44 |
| 2005/0221145 A1 * | 10/2005 | Leonida et al. .............. | 429/34 |
| 2007/0042254 A1 * | 2/2007 | Wozniczka et al. .......... | 429/35 |
| 2008/0213638 A1 | 9/2008 | Brantley et al. | |

OTHER PUBLICATIONS

PCT International Search Report; International Application No. PCT/US2010/030316; International Filing Date Apr. 8, 2010; Date mailed Jun. 10, 2010.
PCT International Preliminary Report on Patentability; International Application No. PCT/US2010/030316; International Filing Date Apr. 8, 2010; Date mailed Jun. 1, 2011.

* cited by examiner

Primary Examiner — Eugenia Wang
(74) Attorney, Agent, or Firm — Michaud-Kinney Group LLP

(57) ABSTRACT

A fuel cell includes an electrolyte matrix having a cathode side with a cathode disposed thereon and an anode side with an anode receiving portion and a sealing portion positioned peripherally to the anode receiving portion. The anode receiving portion has an anode disposed thereon. A fuel conduit has one or more one sealing platforms and having an opening extending through the fuel conduit. The anode is positioned in the opening.
The fuel cell includes one or more devices for preventing the occurrence an electrical short circuit between the cathode and the sealing platform. The device for preventing the electrical short circuit is aligned with the sealing portion and sealing platform and is positioned on the electrolyte matrix, the cathode and/or the sealing platform.

40 Claims, 8 Drawing Sheets

FUEL CELL WITH ELECTRICAL SHORT CIRCUIT PREVENTION MEANS

FIELD OF THE INVENTION

The present invention is generally directed to a fuel cell and is more specifically directed to preventing short circuiting of electrical current in the fuel cell.

BACKGROUND OF THE INVENTION

A fuel cell is a device which uses an electrochemical reaction to convert chemical energy stored in a fuel such as hydrogen or methane into electrical energy. In general, fuel cells include an anode to catalytically react with the fuel and a cathode in fluid communication with an oxidant such as air. The anode and cathode are disposed on opposing sides of an electrolyte material which conducts electrically charged ions therebetween. The electrolyte material and the design of the fuel cell determine the type and performance of the fuel cell. For example Molten Carbonate Fuel Cells (MCFC), which operate at approximately 650° C., typically include an electrolyte which is a molten liquid during operation.

Typical MCFCs include a first conduit disposed adjacent to an anode, a second conduit disposed adjacent to a cathode; and an electrolyte matrix disposed between the anode and the cathode. The first conduit channels fuel to the anode and the second conduit channels an oxidant such as air to the cathode. The first and second conduits can include current collectors and flow distribution members therein.

In a typical MCFC, the cathode is made of a lithiated NiO and the electrolyte includes a carbonate material (e.g., alkali carbonate mixture), for example a material including $CO_3^{-2}$ that is in a liquid form during operation. During operation, nickel ions $Ni^{+2}$ from the NiO cathode can dissolve and re-precipitate as electrically conductive metallic nickel particles in matrix pores and also preferentially in defects such as micro-cracks present within the electrolyte matrix. The nickel particles can join to one another and can cause an electrical short circuit between the cathode and a portion of the first conduit adjacent to the anode. Such electrical short circuits can degrade performance of the MCFC.

SUMMARY OF THE INVENTION

According to one aspect of the present invention, a fuel cell is provided for generating electrical current. The fuel cell includes a porous electrolyte matrix having a cathode side and an anode side. An electrolyte is disposed in the porous electrolyte matrix. The cathode side of the porous electrolyte matrix has a cathode disposed thereon. The cathode and edge portions of the porous electrolyte matrix are exposed to an oxidant such as air. The oxidant can be channeled over the cathode through a conduit having an inlet and outlet. The conduit has an opening for communication of the oxidant with the cathode. The inlet and outlet of the conduit each have a manifold coupled thereto. The manifold has an opening which exposes the oxidant to the edge portions of the porous electrolyte matrix. The oxidant can migrate into the cathode and portions of the porous electrolyte matrix adjacent to the edge portions thereof. The anode side of the porous electrolyte matrix has an anode receiving portion and a sealing portion positioned at or near one or more edges of the anode receiving portion. The anode receiving portion has an anode disposed thereon.

In an embodiment of the present invention, the fuel cell includes a fuel conduit having a base plate, at least one side wall and a mounting portion connected to the base plate by one or more of the side walls. The mounting portion defines one or more sealing platforms thereon. The sealing platform is positioned on the sealing portion of the porous electrolyte matrix, such that the anode is positioned in an opening extending through the mounting portion. The base plate, one or more of the side walls, the sealing platform and the anode cooperate to form an interior area of the fuel conduit. The fuel conduit has an inlet and an outlet extending therethrough for flowing hydrogen-rich fuel through the fuel conduit for reaction with the anode.

The cathode can include lithiated nickel oxide NiO and the electrolyte in the porous electrolyte matrix includes a carbonate material. Dissolved nickel ions $Ni^{+2}$ migrate from the cathode into the porous electrolyte matrix and precipitate as electrically conductive metallic nickel particles in matrix pores and also preferentially in defects such as micro-cracks present within the porous electrolyte matrix. The metallic nickel particles precipitate when the nickel ions $Ni^{+2}$ encounter the reducing fuel environment. The precipitation of nickel ions causes the formation of nickel particles connected to one another thereby providing a short circuit path for the flow of electrical current between the cathode and the sealing platform.

The fuel cell includes one or more devices for preventing the occurrence of an electrical short circuit between the cathode and the sealing platform. The device for preventing the electrical short circuit is aligned with the sealing platform and is positioned on the porous electrolyte matrix, the cathode and/or the sealing platform.

One of the devices for preventing an electrical short between the cathode and the sealing platform includes use of a shim having essentially no nickel for production of $Ni^{+2}$ therein. For example, a portion of the cathode positioned on the cathode side of the porous electrolyte matrix and aligned with the sealing platform is removed thereby creating a vacated area adjacent to the cathode. The shim is positioned on the cathode side of the porous electrolyte matrix in the vacated area and abutting an edge of the cathode. Removing the portion of cathode and positioning the shim in the vacated area substantially reduces and/or essentially eliminates the migration of the $Ni^{+2}$ into portions of the porous electrolyte matrix between the shim and the sealing platform. As such, there is insufficient $Ni^{+2}$ available between the shim and the sealing platform to form enough nickel particles to cause an electrical short circuit between the cathode and the sealing platform.

The present invention also resides in a fuel cell wherein an electrical insulator is disposed on one or more portions of the sealing platform to prevent an electrical short circuit from occurring between the cathode and the sealing platform.

The present invention also resides in a fuel cell wherein the device for preventing short circuiting includes a modified sealing platform having perforations extending therethrough. The perforations provide fluid communication between the interior area of the fuel conduit and the porous electrolyte matrix to allow a layer of hydrogen-rich environment, from the fuel on the anode side, to form a buffer region adjacent to a surface of the sealing platform which abuts the porous electrolyte matrix. The hydrogen-rich layer displaces the oxidant from the buffer region. Consequently, the presence of nickel ions is substantially reduced or does not occur in the buffer region without the oxidant. Because there is little or no nickel ions in the buffer region adjacent to the sealing platform, there is little or no precipitation of the nickel ions into nickel particles. Thus the occurrence of an electrical short circuit between the cathode and the sealing platform is prevented.

DETAILED DESCRIPTION OF THE PREFERRED EMBODIMENTS

Figure 1:
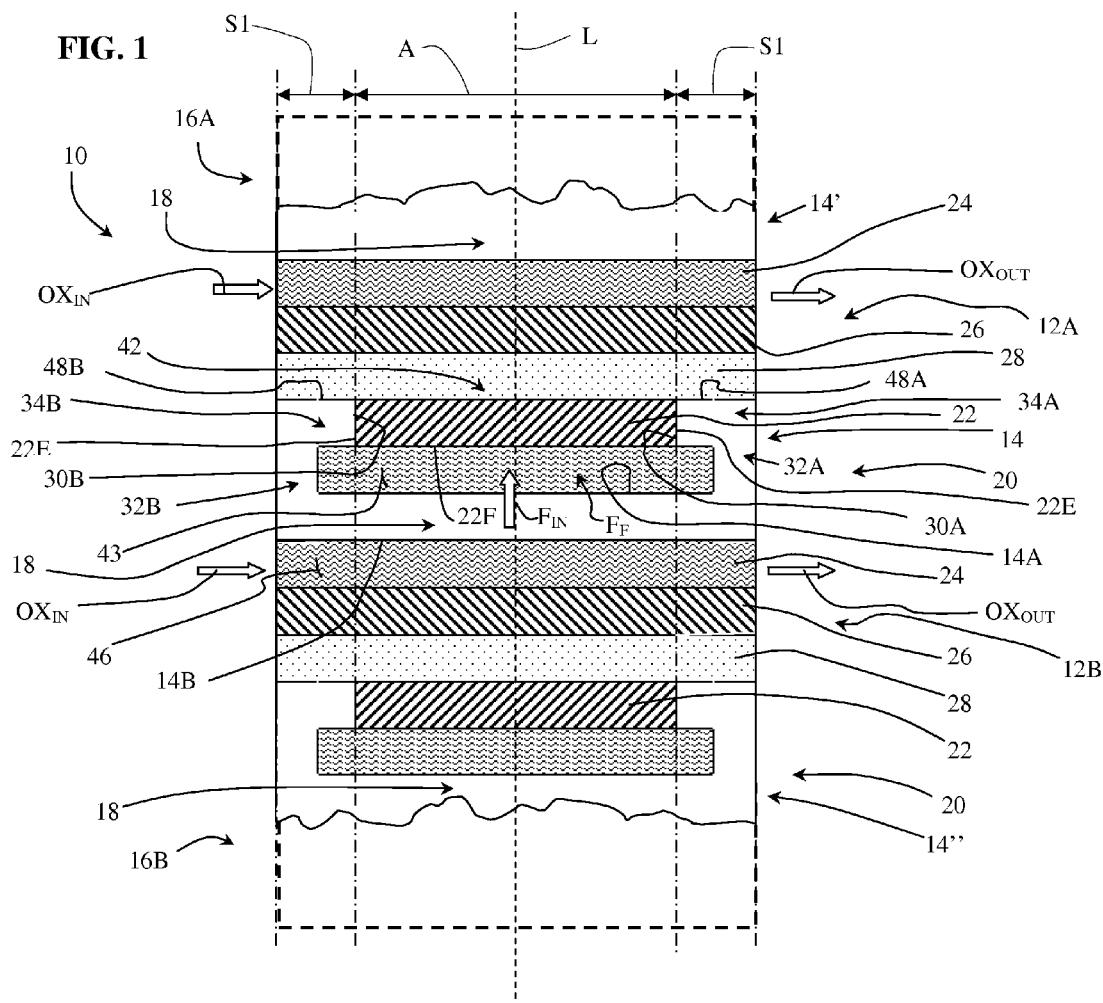
FIG. 1 is a front cross sectional view of a fuel cell stack.
Figure 2:
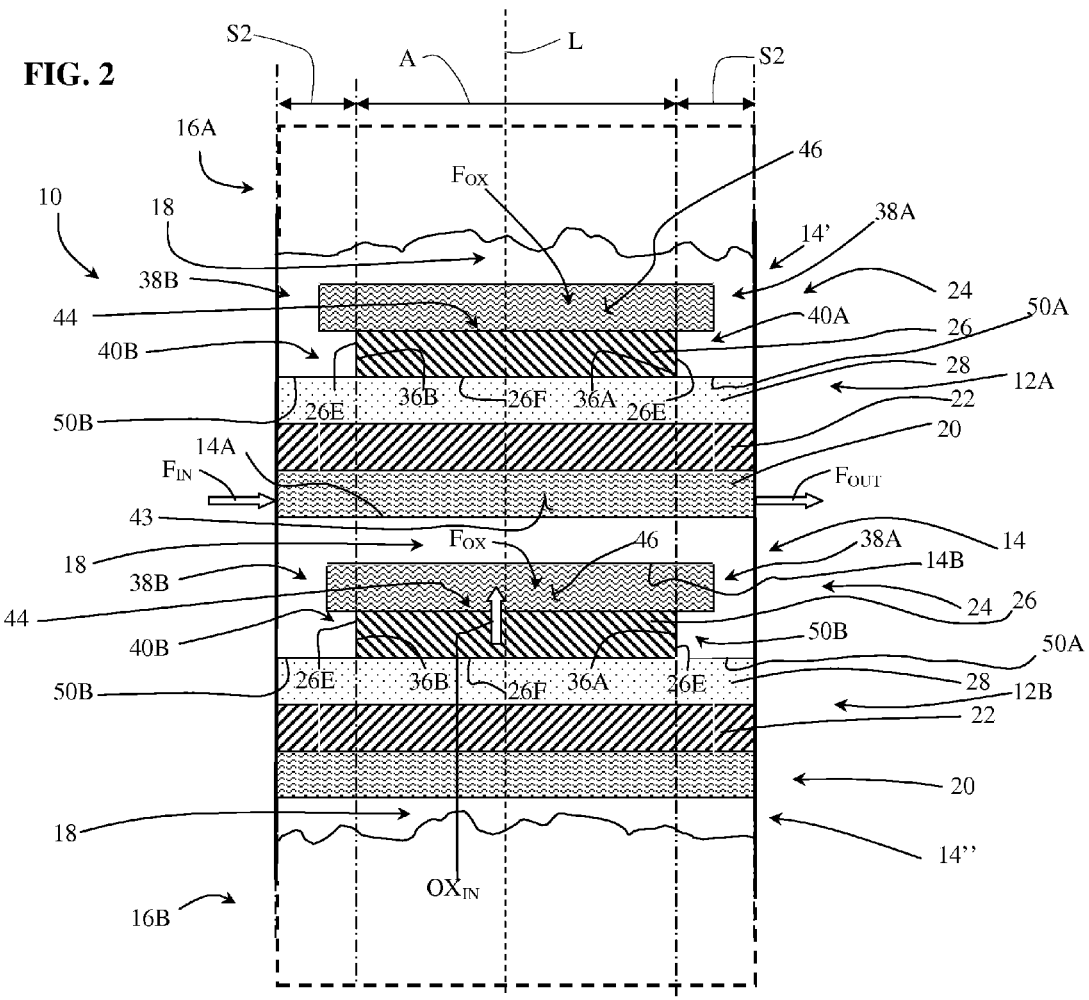
FIG. 2 is a side cross sectional view of the fuel cell stack of FIG. 1.

As shown in FIGS. 1 and 2, two fuel cells 12A, 12B of a multi-cell Molten Carbonate Fuel Cell (MCFC) stack 10 are shown aligned along a longitudinal axis L. The fuel cells 12A, 12B are separated by a portion of a bipolar plate 14 positioned therebetween. The bipolar plate 14 is manufactured from a gas impermeable and electrically conductive material. Additional fuel cells in the MCFC stack 10 are also separated by respective portions of additional bipolar plates. For example, another bipolar plate 14' separates the fuel cell 12A and another fuel cell 16A; and yet another bipolar plate 14" separates the fuel cell 12B and yet another fuel cell 16B. Only a portion of the bipolar plates 14', 14" separating fuel cells 12A/16A and 12B/16B, respectively are illustrated in FIGS. 1 and 2; and fuel cells 16A, 16B are shown in dashed lines.

The bipolar plate 14 has a first surface 14A defined by one face of the bipolar plate and a second surface 14B defined by a parallel and opposite face of the bipolar plate. Each of the fuel cells 12A, 12B have a fuel conduit 20 configured to channel a hydrogen-rich fuel to an anode 22 positioned in an opening of the fuel conduit; and an oxidant conduit 24 configured to channel an oxidant, such as air, to a cathode 26 positioned in an opening of the oxidant conduit, as described below. The bipolar plate 14 defines a portion of the fuel conduit 20 for the fuel cell 12A and the oxidant conduit 24 for fuel cell 12B such that the fuel conduit and the oxidant conduit share a common base portion 18, as described below. The bipolar plate 14' defines a portion of the fuel conduit 20 for the fuel cell 16A and the oxidant conduit 24 for the fuel cell 12A, similar to that described above for the bipolar plate 14. Each of the fuel cells 12A, 12B also include a porous electrolyte matrix 28 disposed between the anode 22 and the cathode 26. An electrolyte (not shown) is disposed in the porous electrolyte matrix 28.

While the bipolar plate 14 and fuel cells 12A, 12B are described in detail above, the bipolar plates 14', 14" are configured similarly to the bipolar plate 14; and the fuel cells 16A, 16B are configured similar to the fuel cells 12A, 12B.

Figure 3:
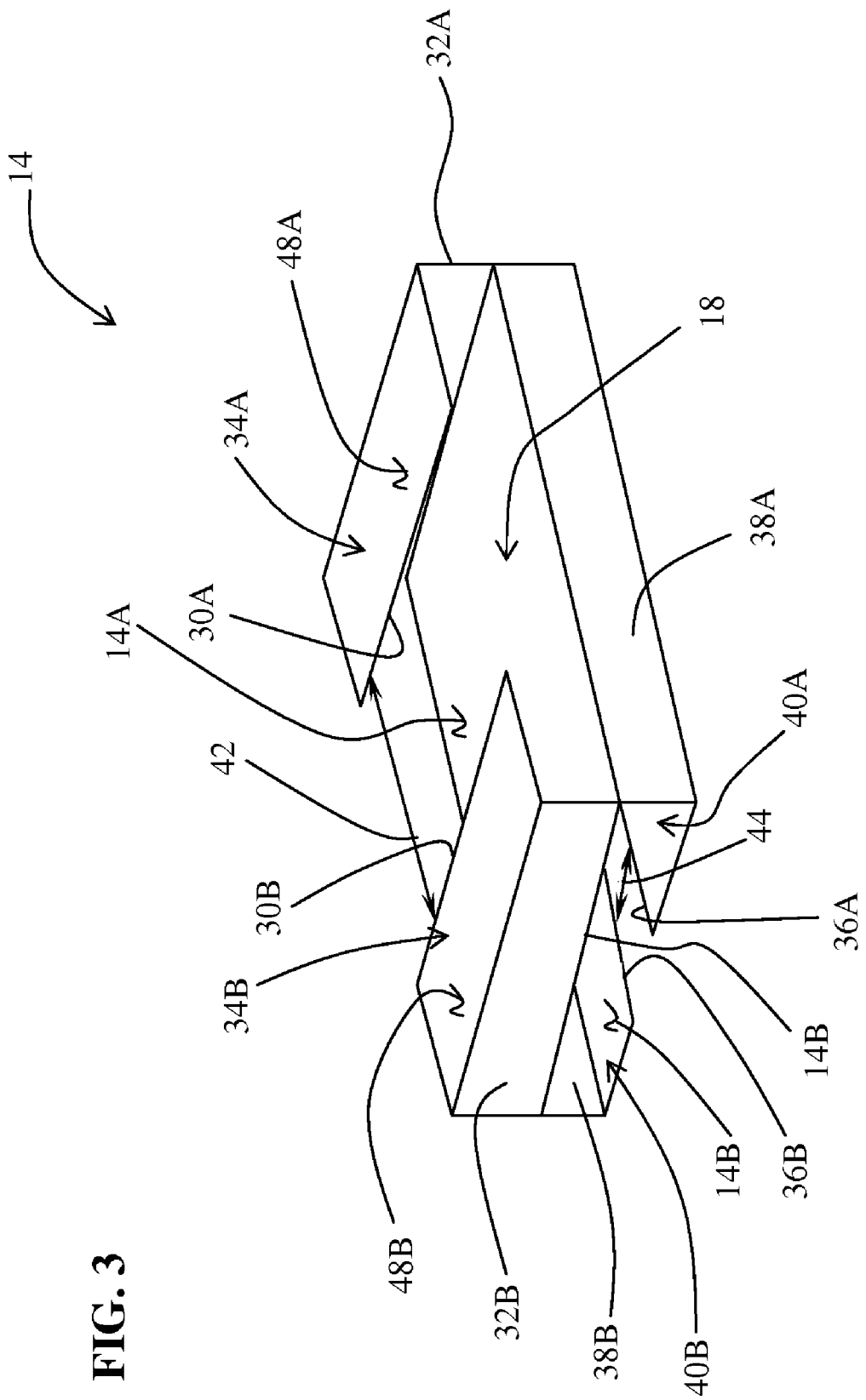
FIG. 3 is a perspective view of a bipolar plate of the fuel cell stack of FIGS. 1 and 2.

As shown in FIGS. 1-3, the bipolar plate 14 defines portions of the fuel conduit 20 for use with the fuel cell 12A and the oxidant conduit 24 for use with the fuel cell 12B. As illustrated in FIGS. 1 and 3, two opposite edges 30A, 30B of the bipolar plate 14 and the first surface 14A of the base portion 18 of the bipolar plate are configured in a first C-shaped cross section. The first surface 14A and the two opposite edges 30A, 30B of the fuel conduit 20 are for use with the fuel cell 12A. The two opposite edges 30A, 30B are spaced apart from and face one another and define an opening 42 therebetween. The anode 22 is positioned in the opening 42 with two opposing edge portions 22E of the anode abutting the opposite edges 30A, 30B and one side of the anode abutting the porous electrolyte matrix 28. The anode 22 is generally parallel to and spaced apart from the base portion 18. The first C-shaped cross section of the bipolar plate 14 includes two side walls 32A, 32B and two anode sealing platforms 34A, 34B of the fuel conduit 20. The anode sealing platforms 34A, 34B extend substantially perpendicularly from the respective side walls 32A, 32B and are generally parallel to the first surface 14A.

Referring to FIGS. 2 and 3, two other opposite edges 36A, 36B of the bipolar plate 14 and the second surface 14B of the bipolar plate are configured in a second C-shaped cross section. The second surface 14B and the two other opposite edges of the oxidant conduit 24 are for use with the fuel cell 12B. The two other opposite edges 36A, 36B are spaced apart from and face one another and define an opening 44 therebetween. The cathode 26 is positioned in the opening 44 with opposing edge portions 26E of the cathode abutting the other opposite edges 36A, 36B and one side of the cathode abutting the porous electrolyte matrix 28. The cathode 26 is generally parallel to and spaced apart from the base portion 18. The second C-shaped cross section of the bipolar plate 14 includes two side walls 38A, 38B and two cathode sealing platforms 40A, 40B of the oxidant conduit 24. The cathode sealing platforms 40A, 40B extend substantially perpendicularly from the respective side walls 38A, 38B and are generally parallel to the second surface 14B. The opposite edges 30A, 30B and the other opposite edges 36A, 36B are arranged approximately perpendicular to one another. The first and second C-shaped cross sections share the base portion 18 and are positioned substantially perpendicular to and face away from each other.

While the two opposite edges 30A, 30B of the bipolar plate 14 and the first surface 14A of the base portion 18 are described as being configured in the first C-shaped cross section; and the two other opposite edges 36A, 36B of the bipolar plate 14 are and the second surface 14B of the base portion 18 are described as being in the second C-shaped cross section, the present invention is not limited in this regard as other cross sections, including but not limited to, L-shaped cross sections can be employed, without departing from the broader aspects of the present invention.

Referring to FIGS. 1 an 2, an interior space FF of the fuel conduit 20 through which fuel flows is defined by the first surface 14A of the bipolar plate 14, inside surfaces of the side walls 32A, 32B and a side 22F of the anode 22 facing the first surface 14A of the base portion 18. The fuel conduit 20 has a manifold (not shown) positioned on each of a fuel inlet side and a fuel discharge side for channeling fuel into and out of the fuel conduit 20, as shown by arrows $F_{IN}$ and $F_{OUT}$, respectively. The fuel is exposed to the anode 22 for reaction therewith. The fuel conduit 20 includes an anode current collector 43 positioned therein to help distribute the fuel uniformly over the anode 22 and conducts electrons from the anode to the bipolar plate 14.

Referring to FIGS. 1 and 2 the second surface 14B of the bipolar plate, inside surfaces of the side walls 36A, 36B and a side 26F of the cathode 26 facing the second surface 14B of the base portion 18 define an interior space $F_{OX}$ of the oxidant conduit 24 in which the oxidant flows through. A manifold (not shown) is positioned on an oxidant inlet side of the MCFC stack 10 for channeling the oxidant along an outside surface of the oxidant inlet side and into the oxidant conduit 24, as shown by arrows $OX_{IN}$. Another manifold is positioned on an opposite facing, cathode exhaust side of the MCFC stack 10 for channeling oxidant rich cathode exhaust gas out of the oxidant conduit 24 and along an outside surface of the cathode exhaust side, as shown by arrows $OX_{OUT}$. The oxidant is exposed to the cathode 26 for reaction therewith. The oxidant migrates into the cathode 26 and the porous electrolyte matrix 28. The oxidant conduit 24 includes a cathode current collector 46 positioned therein that helps distribute the oxidant uniformly over the cathode 26 and conducts electrons delivered to the bipolar plate 14 to, the cathode.

Referring to FIGS. 1-2, central portions of the fuel cells 12A, 12B located in the openings 42, 44 and other portions of the MCFC stack longitudinally aligned therewith, are generally referred to as an active area A of the MCFC stack 10 where electrochemical reactions occur for the production of electrons. Remaining portions of the MCFC stack 10 outside the active area A and longitudinally aligned with the anode sealing platforms 34A, 34B and the cathode sealing platforms 40A, 40B are generally referred to as wet seal areas S1, S2, respectively. The wet seal areas S1, S2 are used to seal adjacent fuel cells 12A, 12B to one another, as described below.

Referring to FIG. 1, portions of the oxidant conduit 24 positioned in the wet seal area S1 sealingly engage mating portions of the cathode 26. Portions of the cathode 26 in the wet seal area S1 sealingly engage mating portions of the porous electrolyte matrix 28. In addition, each of the anode sealing platforms 34A, 34B has a sealing surface 48A, 48B, respectively, positioned on a side of the anode sealing platforms facing away from the base portion 18 thereon and positioned in the in the wet seal area S1. The sealing surfaces 48A, 48B sealingly engage other mating portions of the porous electrolyte matrix 28.

Referring to FIG. 2, portions of the fuel conduit 20 in the wet seal area S2 sealingly engage mating portions of the anode 22. Portions of the anode 22 in the wet seal area S2 sealingly engage mating portions of the porous electrolyte matrix 28. In addition, each of the cathode seal platforms 40A, 40B has a sealing surface 50A, 50B on a side of the cathode sealing platform facing the base portion 18 and positioned in the wet seal areas S2. The sealing surfaces 50A, 50B sealingly engage a mating portion of the porous electrolyte matrix 28.

Figure 4:
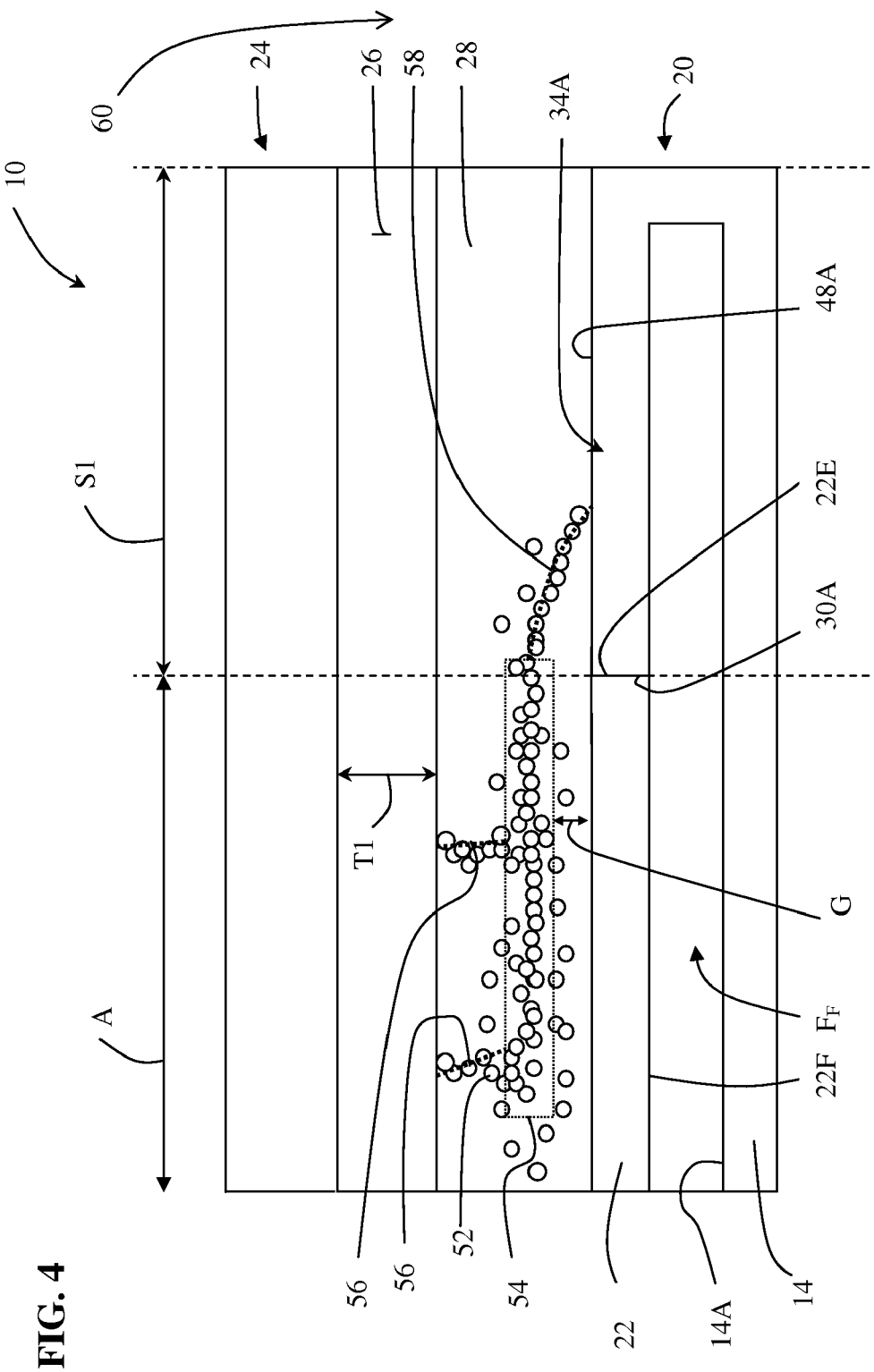
FIG. 4 is a schematic illustration of a portion of the fuel cell stack.

Referring to FIGS. 1, 2 and 4, the cathode 26 is made of a suitable material, for example, lithiated nickel oxide NiO and the electrolyte includes a carbonate material disposed within the porous electrolyte matrix 28. For example, the electrolyte can be a material including $CO_3^{-2}$ that is in a liquid form during operation. The NiO cathode 26 has a low ppm-level solubility in the liquid carbonate electrolyte, for example 5-30 ppm, and therefore dissolves slowly during operation into the electrolyte as $Ni^{+2}$ ions according to an acidic dissolution mechanism shown in Eq. 1 below:

   Eq. 1

The basicity of the liquid carbonate electrolyte (i.e., the melt basicity) is controlled by the carbonate dissociation reaction shown in Eq. 2 below:

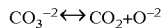   Eq. 2

Referring to FIG. 4, the dissolved nickel ions $Ni^{+2}$ migrate from the cathode 26 into the porous electrolyte matrix 28 and precipitate as electrically conductive metallic nickel particles 52 in pores and also preferentially in defects such as microcracks present within the porous electrolyte matrix. The nickel particles 52 precipitate when the nickel ions $Ni^{+2}$ come in contact with a reducing atmosphere, which has migrated into the porous electrolyte matrix 28. The precipitation of nickel ions causes the formation of a deposition band 54 of nickel particles 52 connected to one another thereby providing a path for the flow of electrical current.

As illustrated in FIG. 4, during operation of the MCFC stack 10, the hydrogen-rich fuel flowing in the interior space FF electrochemically reacts with the anode 22. As a result of the diffusional mass transfer from the hydrogen-rich fuel, a hydrogen-rich layer forms in a region G of the porous electrolyte matrix 28 adjacent to the anode 22. The deposition band 54 is spaced apart from the anode 22 by the hydrogen-rich layer in the region G. The presence of layer of the hydrogen-rich environment in the region G displaces the oxidizing atmosphere toward the cathode 26 and therefore substantially reduces and/or essentially eliminates the presence of nickel ions in the region G and therefore substantially reduces and/or eliminates the precipitation of nickel ions into nickel particles in the hydrogen-rich layer in the region G. In addition, the deposition band 54 becomes spread out and migrates toward the anode 20 due to electric current flow across the MCFC. Nickel particle chains 56 extend from the deposition band 54 in the micro-cracks present in the porous electrolyte matrix 28 and connect to the cathode 26. The nickel particle chains 56 provide electrical communication between the deposition band 54 and the cathode 26.

In addition, a deposition leg 58 extends from the deposition band 54 to the sealing surfaces 48A providing electrical communication therebetween. The deposition legs 58 curve toward and extend to the sealing surface 48A because of the presence of the oxidant 60 in the cathode inlet or exhaust along an outside surface of the cathode inlet or exhaust side, as described above. The oxidant migrates into the porous electrolyte matrix 28 and provides the oxidizing atmosphere in which nickel ions $Ni^{+2}$ dissolve. The dissolved nickel ions $Ni^{+2}$ re-precipitate as nickel particles 52 when the nickel ions encounter the hydrogen diffused from the anode 22. Over time, the nickel particle chains 56, the deposition band 54 and the deposition leg 58 become in electrically conductive communication with one another and cause an electrical short circuit between the cathode 26 and the sealing surface 48A. Such electrical short circuits can degrade performance of the MCFC stack 10.

While only one deposition leg 58 and two nickel particle chains 56 are described, additional deposition legs and nickel particle chains can develop. Although the nickel particles 52 re-precipitate in the deposition band 54, the nickel particle chains 56 and the deposition leg 58, nickel particles can also precipitate in the layer of the hydrogen-rich environment in the region G. However, because majority of the $Ni^{+2}$ already precipitate out in the deposition band 54, the nickel particle chains 56 and the deposition leg 58, there are substantially less nickel ions $Ni^{+2}$ left to precipitate in the layer of hydrogen-rich environment in the region G. Therefore, the length of time to form a significant amount of nickel particles in the layer of the hydrogen-rich environment in the region G is substantially longer than the period of time it takes to form nickel particles in the deposition band 54, the nickel particle chains 56 and the deposition leg 58. Thus formation of nickel particles in the deposition band 54, the nickel particle chains 56 and the deposition leg 58 can degrade MCFC performance more rapidly than due to the formation of nickel particles in the layer of the hydrogen-rich environment in the region G.

Figure 5:
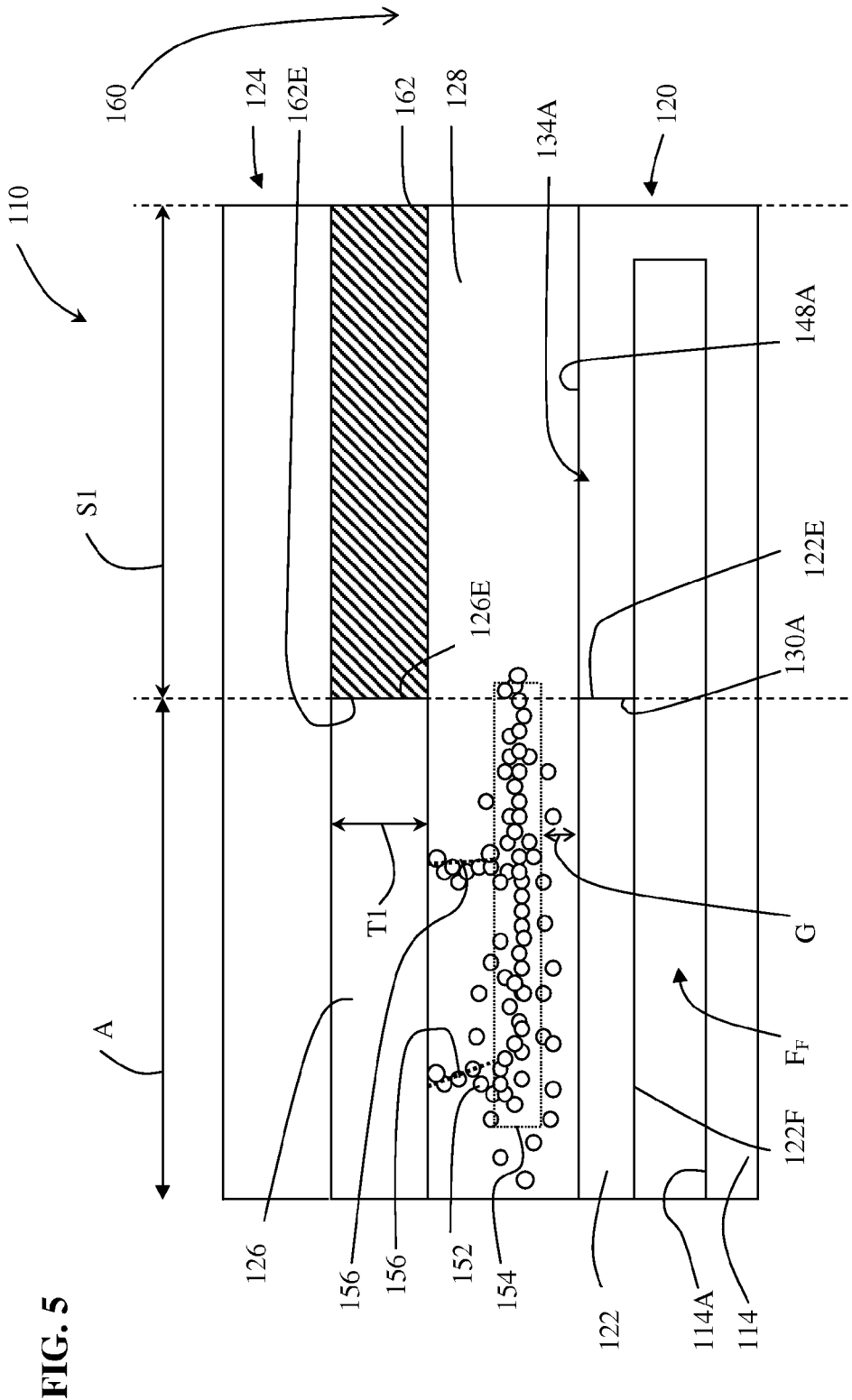
FIG. 5 is a schematic illustration of a portion of the fuel cell stack having a cathode shim positioned on the porous electrolyte matrix.

The MCFC stack of FIG. 5 is similar to that of FIGS. 1 and 2. Therefore, like elements will be given like numbers preceded by the numeral 1. A portion of the cathode 126 substantially equal in width and length to that of the wet seal area S1 is removed from the cathode. While FIG. 5 only illustrates one side of the MCFC stack 110, another portion of the cathode substantially equal in width and length to that of the other wet seal area S1 is removed from an opposite side of the cathode.

A shim 162 having a thickness T1 approximately equal to that of the cathode 126 and a width and length about equal to that of removed cathode portions is fitted into each of the areas vacated by the removed cathode portions and between respective portions of the oxidant conduit 124 and the porous electrolyte matrix 128. Inner edges 162E of the shims 162 abut respective severed edges 126E of the cathode 126.

The shim 162 is manufactured from a material having essentially no nickel available for production of nickel ions $Ni^{+2}$ and is suitable for high temperature operation (i.e., approximately 650° C.). Suitable materials are ceramics and some metal alloys. The shim can be manufactured from austenitic or ferritic stainless steel alloys such as AISI 310S, AISI 446, Fecralloy, Kanthal AF, Fe-based high-temperature alloys A286. While such materials may contain nickel therein, the nickel is not easily available to form nickel ions $Ni^{+2}$ because of chemical bonds that the nickel forms within the alloys and within any surface oxides formed during fuel cell operation. The removal of the portions of the cathode 126 and replacement with the shim 162 substantially reduces and/or essentially eliminates the nickel ion $Ni^{+2}$ source in the seal areas S1. As such, there is insufficient nickel ions $Ni^{+2}$ locally available in the seal areas S1 to form enough nickel particles 152 therein to connect to the deposition band 154 to the sealing surface 148A. Therefore migration of the deposition band 154 into the seal areas S1 is prevented. The use of the shim 162 in this manner prevents the occurrence of an electrical short circuit between the cathode 126 and the sealing surfaces 148A, 148B thereby improving the performance and extending the useful life of the MCFC stack 10.

Although the shim 162 is described as having a thickness T1 approximately equal to that of the cathode 126, the present invention is not limited in this regard and one or more shims of greater or lesser thickness than that of the cathode can also be employed.

Figure 6:
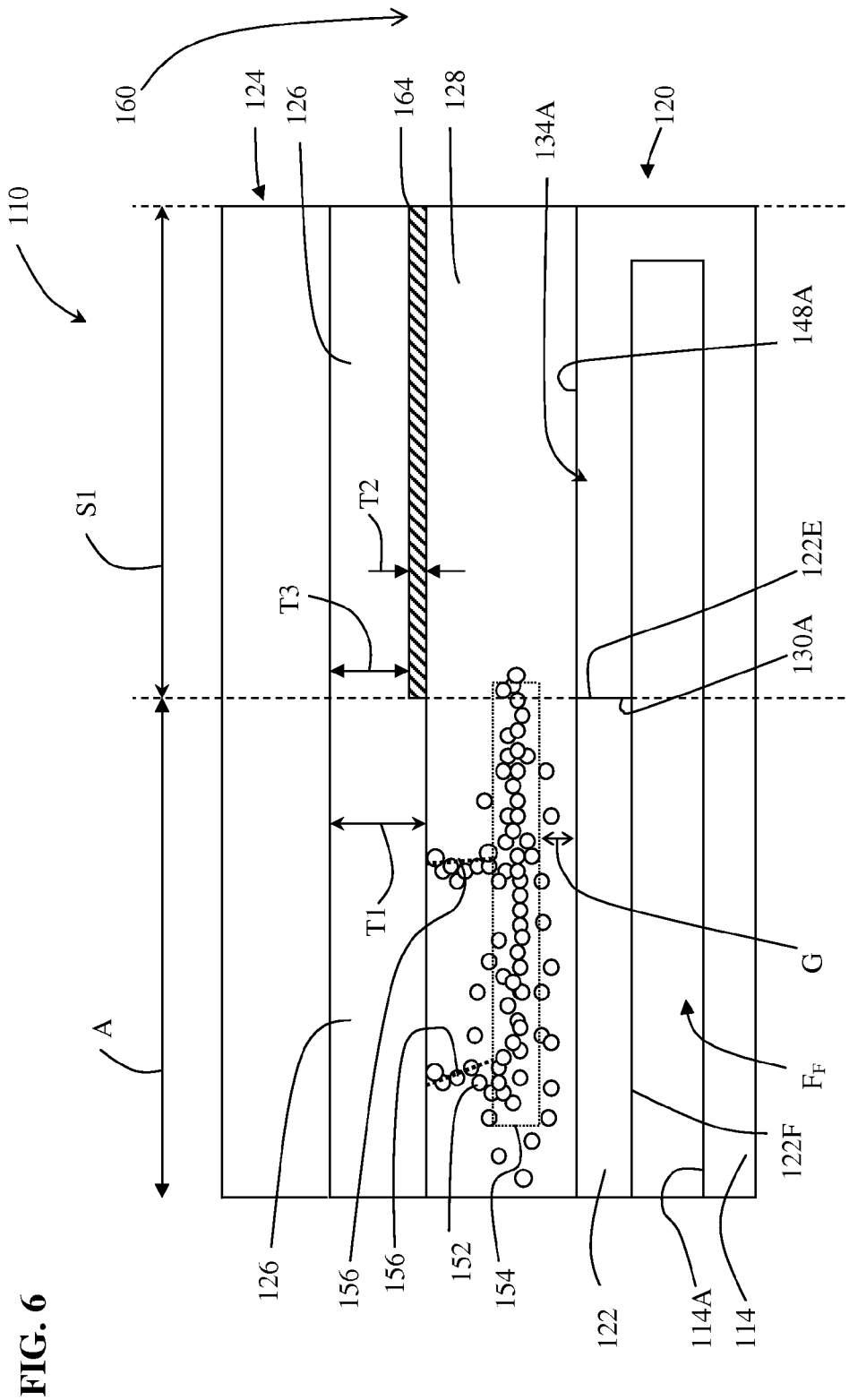
FIG. 6 is a schematic illustration of a portion of the fuel cell stack having a cathode barrier layer.

Referring to FIG. 6, a barrier layer 164 is compressed in the seal area S1 between the cathode 126 and the porous electrolyte matrix 128. The barrier layer 164 has a thickness T2 less than the thickness T1 of the cathode 126 in the active area A. As a result of compressing the barrier layer 164 between the cathode 126 and the porous electrolyte matrix 128, the cathode 126 is compressed to a thickness T3. When compressed, the combined thickness (i.e., T2 plus T3) of the barrier layer 164 and the portion of the cathode positioned in the wet seal area S1 is about equal to the thickness T1 of the portion of the cathode in the active area A.

The barrier layer 164 can be manufactured from a material such as that used to manufacture the shim 162 as described above. Similar to that described above for the shim 162, the barrier layer 164 substantially reduces and/or essentially eliminates the $Ni^{+2}$ source in the seal areas S1, S2 and prevents electrical short circuiting between the cathode 126 and the sealing surfaces 148A, 148B.

While FIG. 6 only illustrates one side of the MCFC stack 110, another barrier layer (not shown) is compressed in the other wet seal area S1 on an opposite side of the cathode 126, similar to that described above for the barrier layer 164. While the barrier layer 164 is described as being disposed in the seal areas S1 on a surface of the cathode 126 facing the porous electrolyte matrix 128, the present invention is not limited in this regard as one or more barrier layers can be positioned in the porous electrolyte matrix between the cathode 126 and the sealing surfaces 148A, 148B without departing from the broader aspects of the present invention. Although the barrier layer 164 is described as having a thickness T2 less than the thickness T1 of the cathode 126, the present invention is not limited in this regard as barrier layers of any thickness can be employed including but not limited to those having thicknesses greater than or equal to that of the cathode 126 and/or the porous electrolyte matrix 128.

Figure 7:
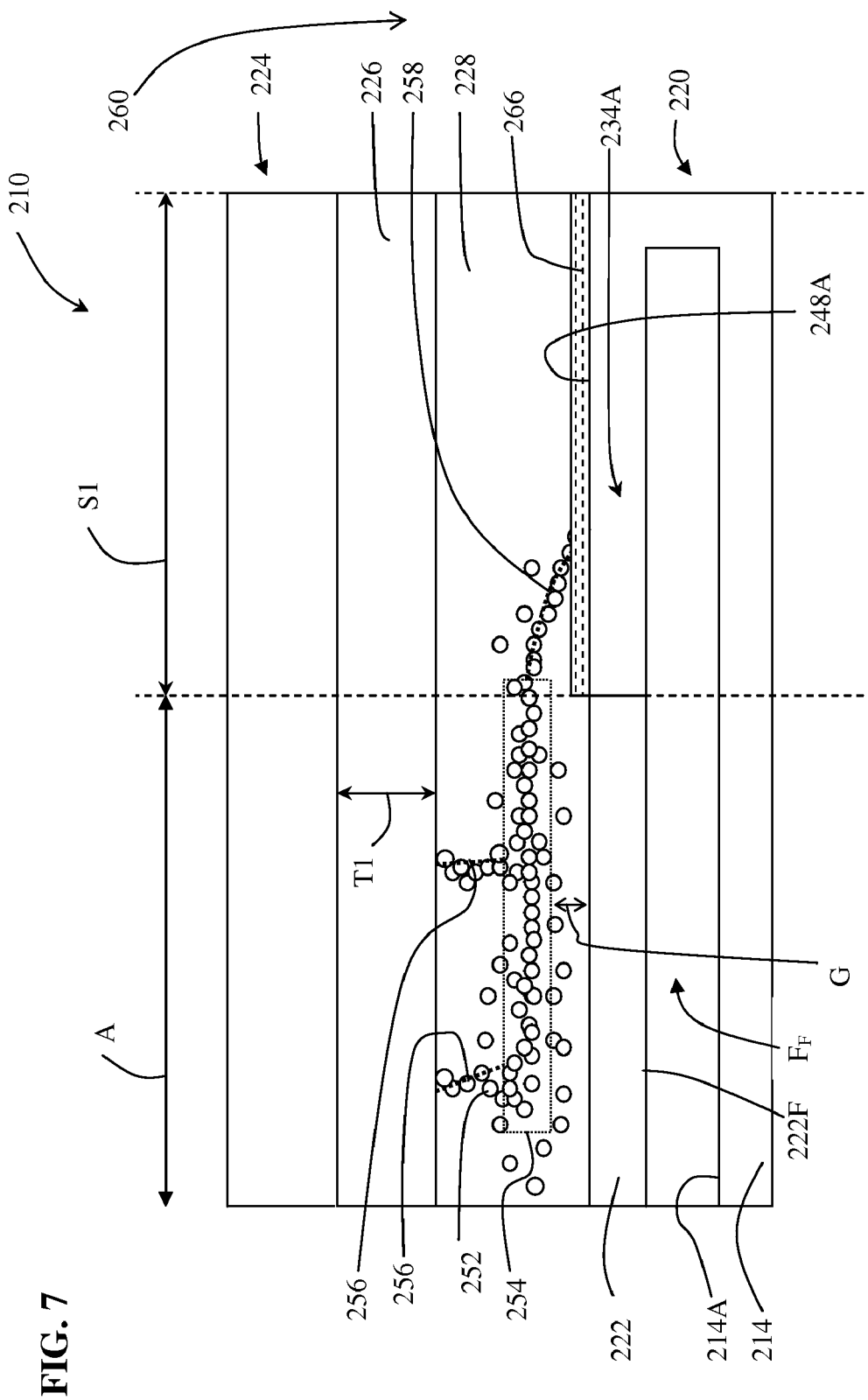
FIG. 7 is a schematic illustration of a portion of the fuel cell having an insulating layer positioned on the sealing platform.

The MCFC of FIG. 7 is similar to that of FIGS. 1 and 2. Therefore, like elements will be given like numbers preceded by the numeral 2. As shown in FIG. 6, an electrical insulator 266 is disposed in the wet seal area S1. One side of the electrical insulator 266 engages the sealing surface 248A and an opposing side of the electrical insulator engages the porous electrolyte matrix 228. The electrical insulator 266 blocks the flow of electricity from the cathode 226 to the sealing surface. The electrical insulator 266 is a strip manufactured from a suitable material such as, for example, an electrically insulating ceramic or alumina material.

Similar to that described above for FIGS. 5 and 6, dissolved nickel ions $Ni^{+2}$ precipitate as electrically conductive metallic nickel particles 252 in defects such as micro-cracks present within the porous electrolyte matrix 228 forming: 1) a deposition band 254 of nickel particles 252 connected to one another; and 2) nickel particle chains 256 in the micro-cracks. The nickel particle chains 256 are connected to the cathode 226. A deposition leg 258 extends from the deposition band 254 and curves towards the sealing surface due to the presence of oxygen 260 in the cathode inlet or exhaust along an outside surface of the cathode inlet or exhaust side, as described above. However, the electrical insulator 266 prevents the occurrence of an electrical short circuit between the cathode 226 and the sealing area 248A.

Figure 8:
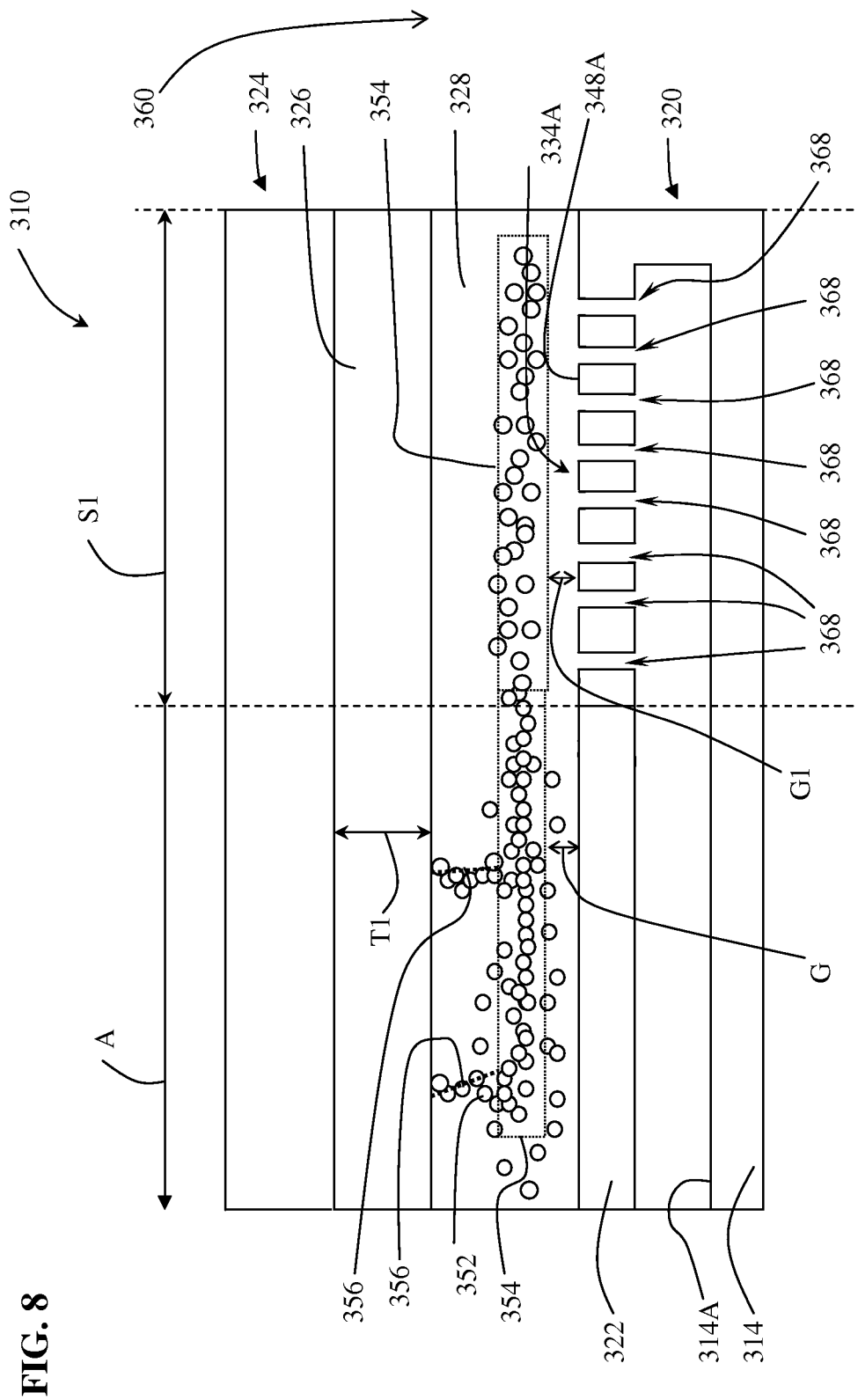
FIG. 8 schematically illustrates a portion of the fuel cell stack having a partially perforated bipolar plate.

The MCFC of FIG. 8 is similar to that of FIGS. 1 and 2. Therefore, like elements will be given like numbers preceded by the numeral 3. The nickel ions $Ni^{+2}$ re-precipitate as nickel particles when the nickel ions encounter the layer of the hydrogen-rich environment which is a reducing atmosphere. Nickel particles 352 precipitate in both the seal area S1 and the active area A. A deposition band 354 of nickel particles 352 extends from the active area A into the seal areas S1, S2.

Still referring to FIG. 8, the anode sealing platform 334A has perforations 368 extending therethrough. The perforations 368 provide fluid communication between the first conduit 318 and the porous electrolyte matrix 328. The perforations 368 allow hydrogen from the fuel to flow therethrough and into a region G1 adjacent to the sealing surface 348A thereby forming a layer of a hydrogen-rich environment adjacent to the sealing surface. The presence of the layer of the hydrogen-rich environment in the region G1 displaces the oxidizing atmosphere toward the cathode 326 and therefore substantially reduces or essentially eliminates the formation of nickel ions in the region G1. Thus there are little or no nickel ions present in the region G1 to re-precipitate into nickel particles and therefore the formation of nickel deposition legs in the area adjacent to the second surface is substantially reduced or precluded. The perforations 368 and the presence of the layer of the hydrogen-rich environment in the region G1 prevent the occurrence an electrical short circuit between the cathode 326 and the sealing surface 348A.

Although the present invention has been disclosed and described with reference to certain embodiments thereof, it should be noted that other variations and modifications may be made, and it is intended that the following claims cover the variations and modifications within the true scope of the invention.

What is claimed is:

1. A fuel cell comprising:
    a porous electrolyte matrix defining a cathode abutment portion and an anode abutment portion, said cathode abutment portion having a cathode disposed thereon which is exposed to an oxidant and during operation comprises dissolved nickel ions, said anode abutment portion defining an anode receiving portion, said anode abutment portion defining a sealing portion positioned peripherally to said anode receiving portion, and said anode receiving portion having an anode disposed thereon;
    a fuel conduit defined by a base plate, at least one side wall and a sealing platform connected to the base plate by said at least one side wall, said sealing platform defining at least one sealing surface thereon and a first opening extending between inwardly facing edges of said sealing platform, said sealing surface abuts said sealing portion of said anode abutment portion of said electrolyte matrix such that said anode is positioned in said first opening;
    said base plate, said at least one side wall, said sealing platform and said anode cooperate to form an interior area of said fuel conduit, said fuel conduit having an inlet and an outlet extending therethrough for flowing fuel through said fuel conduit for reaction with said anode; and
    a barrier layer manufactured from a metallic material, the barrier layer prevents the occurrence of an electrical short circuit between said cathode and said sealing platform, said barrier layer being aligned with said sealing platform and positioned on said electrolyte matrix and said barrier layer prevents said dissolved nickel ions from migrating from said cathode into said electrolyte matrix.

2. The fuel cell of claim 1, wherein said barrier layer is positioned between said cathode abutment portion of said electrolyte matrix and said cathode, such that at least a portion of said cathode aligned with said sealing platform is compressed.

3. The fuel cell of claim 2, wherein said barrier layer engages said electrolyte matrix and said cathode.

4. The fuel cell of claim 1, wherein said anode receiving portion and said sealing portion of said electrolyte matrix are coplanar.

5. The fuel cell of claim 1, wherein said sealing platform comprises opposing flanges and said opening is disposed between said opposing flanges.

6. The fuel cell of claim 5, wherein each of said opposing flanges define edges that face one another and said anode is disposed between said edges.

7. The fuel cell of claim 1, wherein the sealing surface is outwardly facing from said sealing platform.

8. The fuel cell of claim 1, wherein said barrier layer prevents the occurrence of electrical short circuits in the electrolyte matrix.

9. The fuel cell of claim 1, wherein said fuel conduit is electrically conductive.

10. The fuel cell of claim 1, wherein said base plate, said at least one side wall and said sealing platform form a single bipolar plate which is electrically conductive.

11. The fuel cell of claim 1, wherein said barrier layer is separate from said sealing platform.

12. The fuel cell of claim 1, wherein said inlet of said fuel conduit is defined by a second opening on a side face of said fuel cell, said side face being perpendicular to said cathode abutment portion and said anode abutment portion, said second opening being positioned between said base plate, said at least one side wall, said sealing platform and said anode.

13. The fuel cell of claim 1, wherein said cathode abutment portion and said anode abutment portion are defined by opposing faces of said porous electrolyte matrix, said electrolyte matrix defining a first edge extending between said opposing faces and being perpendicular thereto, said electrolyte matrix defining a second edge extending between said opposing faces and being perpendicular to said opposing faces, and said first edge being exposed to said oxidant.

14. The fuel cell of claim 1, wherein said fuel cell defines at least one side face perpendicular to said cathode abutment portion and said anode abutment portion and having a third opening on said side face, the third opening being positioned between edges of said oxidant conduit and said cathode.

15. The fuel cell of claim 1, wherein said cathode abutment portion and said anode abutment portion are defined by opposing faces of said porous electrolyte matrix, said electrolyte matrix defining a first edge extending between said opposing faces and being perpendicular thereto, said electrolyte matrix defining a second edge extending between said opposing faces and being perpendicular to said opposing faces, and said second edge being exposed to said fuel.

16. The fuel cell of claim 1, wherein said barrier layer prevents said dissolved nickel ions from precipitating as electrically conductive metallic nickel particles in pores in said electrolyte matrix.

17. The fuel cell of claim 1, wherein said barrier layer is positioned on a lateral side of said electrolyte matrix which is parallel to said cathode.

18. The fuel cell of claim 1, wherein said electrolyte matrix retains a liquid electrolyte during operation.

19. The fuel cell of claim 1, wherein the barrier layer is manufactured from a material suitable for operation at a temperature of 650 degrees Celsius.

20. A molten carbonate fuel cell comprising:
    a cathode comprising nickel and during operation said cathode comprises dissolved nickel ions;
    a porous electrolyte matrix defining a cathode abutment portion and an anode abutment portion, said cathode abutment portion having a cathode disposed thereon which is exposed to an oxidant, said anode abutment portion defining an anode receiving portion, said anode abutment portion defining a sealing portion positioned peripherally to said anode receiving portion, said anode receiving portion having an anode disposed thereon, and the porous electrolyte matrix having a carbonate material disposed therein, the carbonate material being in a liquid state during operation of said molten carbonate fuel cell;
    a fuel conduit defined by a base plate, at least one side wall and a sealing platform connected to the base plate by said at least one side wall, said sealing platform defining at least one sealing surface thereon and an opening extending between inwardly facing edges of said sealing platform, said sealing surface abuts said sealing portion of said anode abutment portion of said electrolyte matrix such that said anode is positioned in said opening;
    said base plate, said at least one side wall, said sealing platform and said anode cooperate to form an interior area of said fuel conduit, said fuel conduit having an inlet and an outlet extending therethrough for flowing fuel through said fuel conduit for reaction with said anode; and a barrier layer positioned on said electrolyte matrix and aligned with said sealing platform, and during operation of said molten carbonate fuel cell, said barrier layer prevents the occurrence of an electrical short circuit between said cathode and said sealing platform and prevents said dissolved nickel ions from migrating from said cathode into said electrolyte matrix.

21. The fuel cell of claim 20, wherein said barrier layer is positioned between said cathode abutment portion of said electrolyte matrix and said cathode, such that at least a portion of said cathode aligned with said sealing platform is compressed.

22. The fuel cell of claim 21, wherein said barrier layer engages said electrolyte matrix and said cathode.

23. The fuel cell of claim 20, wherein said anode receiving portion and said sealing portion of said electrolyte matrix are coplanar.

24. The fuel cell of claim 20, wherein said sealing platform comprises opposing flanges and said opening is disposed between said opposing flanges.

25. The fuel cell of claim 24, wherein each of said opposing flanges define edges that face one another and said anode is disposed between said edges.

26. The fuel cell of claim 20, wherein the sealing surface is outwardly facing from said sealing platform.

27. The fuel cell of claim 20, wherein said barrier layer prevents the occurrence of electrical short circuits in the electrolyte matrix.

28. The fuel cell of claim 20, wherein said fuel conduit is electrically conductive.

29. The fuel cell of claim 20, wherein said base plate, said at least one side wall and said sealing platform form a single bipolar plate which is electrically conductive.

30. The fuel cell of claim 20, wherein said barrier layer is separate from said sealing platform.

31. The fuel cell of claim 20, wherein said inlet of said fuel conduit is defined by a second opening on a side face of said fuel cell, said side face being perpendicular to said cathode abutment portion and said anode abutment portion, said second opening being positioned between said base plate, said at least one side wall, said sealing platform and said anode.

32. The fuel cell of claim 20, wherein said cathode abutment portion and said anode abutment portion are defined by opposing faces of said porous electrolyte matrix, said electrolyte matrix defining a first edge extending between said opposing faces and being to perpendicular thereto, said electrolyte matrix defining a second edge extending between said opposing faces and being perpendicular to said opposing faces, and said first edge being exposed to said oxidant.

33. The fuel cell of claim 20, wherein said fuel cell defines at least one side face perpendicular to said cathode abutment portion and said anode abutment portion and having a third opening on said side face, the third opening being positioned between edges of said oxidant conduit and said cathode.

34. The fuel cell of claim 20, wherein said cathode abutment portion and said anode abutment portion are defined by opposing faces of said porous electrolyte matrix, said electrolyte matrix defining a first edge extending between said opposing faces and being perpendicular thereto, said electrolyte matrix defining a second edge extending between said opposing faces and being perpendicular to said opposing faces, and said second edge being exposed to said fuel.

35. The fuel cell of claim 20, wherein said barrier layer prevents said dissolved nickel ions from precipitating as electrically conductive metallic nickel particles in pores in said electrolyte matrix.

36. The fuel cell of claim 20, wherein said barrier layer is positioned on a lateral side of said electrolyte matrix which is parallel to said cathode.

37. The fuel cell of claim 20, wherein said electrolyte matrix retains a liquid electrolyte during operation.

38. The fuel cell of claim 20, wherein the barrier layer is manufactured from a material suitable for operation at a temperature of 650 degrees Celsius.

39. The fuel cell of claim 20, wherein the barrier layer is manufactured from a ceramic material.

40. The fuel cell of claim 20, wherein the barrier layer is manufactured from a metallic material.

* * * * *

UNITED STATES PATENT AND TRADEMARK OFFICE
CERTIFICATE OF CORRECTION

PATENT NO. : 8,383,283 B2  
APPLICATION NO. : 12/424196  
DATED : February 26, 2013  
INVENTOR(S) : Chao-yi Yuh et al.

It is certified that error appears in the above-identified patent and that said Letters Patent is hereby corrected as shown below:

On the Title page, Item (75) Inventors: Please delete "Yun" and replace with --Yuh--.

On the Title page, Item (57) please delete "includes" and replace with --including--.

Signed and Sealed this  
Twenty-sixth Day of November, 2013

Margaret A. Focarino  
*Commissioner for Patents of the United States Patent and Trademark Office*